United States Patent Office 3,799,970
Patented Mar. 26, 1974

---

3,799,970
ORTHO-PHENYLENEDIOXYDIMALONATES
Marvin M. Crutchfield, Creve Coeur, and John N. Rapko, St. Louis, Mo., assignors to Monsanto Company, St. Louis, Mo.
No Drawing. Filed Jan. 22, 1973, Ser. No. 325,761
Int. Cl. C07c 65/00
U.S. Cl. 260—473 G    6 Claims

ABSTRACT OF THE DISCLOSURE

Novel ortho-phenylenedioxydimalonates, represented by the formula

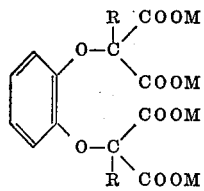

wherein R is hydrogen, methyl, or ethyl, and M is alkali metal or ammonium, are useful sequestrants and detergency builders. The ester, acid, ester-salt, ester-acid, acid-salt, and ester-acid salt forms of such compounds are useful intermediates for the preparation of the salts.

BACKGROUND OF THE INVENTION

This invention relates to novel compounds useful as sequestrants and detergency builders, novel intermediates in the preparation of such compounds, methods of making such compounds and their intermediates, and detergent formulations containing such compounds.

The utility of materials having the ability to sequester various ions from aqueous media is well recognized. For example, materials having ability to sequester calcium ions, iron ions, etc. are extensively utilized in treating water to prevent formation of scale or building up of precipitants in boilers, water towers, heat exchangers, etc. Some materials of this type are empirically found to also be useful as detergency builders. That is, they reinforce, augment, and/or supplement the cleansing ability of detergent formulations.

It is emphasized that not all sequestrants are practically useful as builders and the determination of which sequestrants are suitable builders is not readily nor accurately predictable.

It is apparent from the recognized utility of sequestrant and builder materials that the provision of novel materials having sequestrant or builder properties constitutes a contribution to the chemical art.

SUMMARY OF THE INVENTION

It is an object of this invention to provide novel compounds useful as detergency builders and sequestrants, intermediate compounds thereof, methods of manufacturing such compounds, and detergent formulations containing those compounds that are builders.

The excellent sequestrants and detergency builders of the present invention are also phosphorus-free and thus are particularly adapted for use in areas where phosphorus is believed under prevailing environmental conditions to contribute to the acceleration of eutrophication processes.

The compounds of this invention are ortho-phenylenedioxydimalonates whose manufacture and utility will be better understood from the following description of the preferred embodiments.

DESCRIPTION OF THE PREFERRED EMBODIMENTS

The novel compounds of this invention are represented by the formula

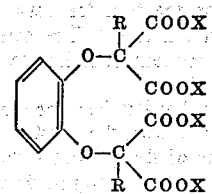

wherein R is hydrogen, methyl, or ethyl; X is alkali metal, ammonium, hydrogen, methyl, ethyl or propyl, provided that both R groups are identical. The detergency builder performance of the salt forms of the foregoing compounds in which R is hydrogen is, relatively, superior.

Exemplary compounds of the present invention include o-phenylenedioxydimalonic acid, o-phenylenedioxy-$\alpha,\alpha'$-dimethyldimalonic acid, o-phenylenedioxy-$\alpha,\alpha'$-diethyldimalonic acid; the corresponding tetra alkali metal and ammonium salts such as tetra sodium and tetra ammonium o-phenylenedioxy-$\alpha,\alpha'$-dimethyldimalonate; the corresponding tetra esters such as tetra methyl, tetra ethyl, or tetra propyl o-phenylenedioxydimalonate; diacid diesters such as dihydrogen dimethyl o-phenylenedioxy-$\alpha,\alpha'$-dimalonate.

In accordance with the process of this invention, the diester disalt compounds of the invention (two X substituents are alkali metal or ammonium and two X substituents are methyl, ethyl or propyl) are prepared by reacting carbon dioxide and a diester dianion represented by the formula

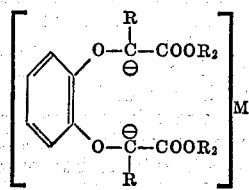

wherein R is hydrogen, methyl or ethyl, $R_2$ is methyl, ethyl, or propyl, $M^{++}$ represents 2 monovalent or 1 divalent alkali metal or alkaline earth metal cations such as $2Li^+$, $2Na^+$, $2K^+$, $Mg^{++}$, $Ca^{++}$, etc. The reaction is preferably conducted at a temperature of from $-40°$ C. to $-80°$ C. in an inert solvent having a freezing point lower than the reaction temperature. The solvent can be tetrahydrofuran, diethyl ether, etc.

The diester dianion utilized in the preparation of the diester disalt is prepared by reacting a "starting ester" and a strong base.

The "starting ester" is represented by the formula

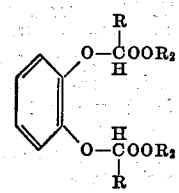

wherein R is hydrogen, methyl, or ethyl, and $R_2$ is methyl, ethyl, or propyl, and R and $R_2$ correspond to the R and $R_2$ desired on the resultant diester dianion.

The "strong base" is a base capable of withdrawing the alkyl protons from the "starting ester." Such bases are, for example, $LiNH_2$, or lithium diisopropylamide or alkali metals and alkaline earth metals such as metallic sodium, lithium, potassium, calcium, or magnesium. It is especially preferred to use lithium diisopropylamide because of its relative strength and solubility. Weaker bases such as NaOH, KOH, Ca(OH)$_2$, can be used in the preparation of the diester dianion if precautions are taken to remove water from the reaction medium.

The reaction to prepare the diester dianion is preferably conducted by reacting a strong base, of the type described above, with the appropriate "starting ester," at −80° C. to −40° C. in an inert solvent having a freezing point below the reaction temperature such as tetrahydrofuran, diethyl ether, etc. The same solvent can be utilized in the subsequent reaction to make the diester disalt.

After the diester dianion has been prepared and converted to the diester disalt, the diester disalt is converted to the diacid diester of the present invention by acidulating the diester disalt with strong acids such as HCl, HBr, or H$_2$SO$_4$ (strong acids such as HNO$_3$ and HClO$_4$ that have high oxidation potential should be avoided because they tend to breakdown the molecule), or by contact with strongly acidic ion exchange resins. Suitable ion exchange resins are those having from 5 to 10 milliequivalents per gram, on a dry basis, such as sulfonated polystyrene resins. The use of ion exchange resins of this type is particularly preferred.

The solvent utilized in the above reactions can be removed either prior to the acidulation of the diester disalt or after such acidulation by conventional distillation procedures.

The above described diacid diesters can be utilized to prepare the tetra ester forms of the ortho-phenylenedioxydimalonate.

Specifically, the tetra esters are conveniently prepared by esterifying the diacid diesters. Such esterification may be accomplished by any of the well-known esterification techniques. However, it is especially preferred that they be prepared by the conventional Fisher esterification procedure, involving addition of the appropriate alcohol or alcohols and a catalytic amount of strong acid, e.g. H$_2$SO$_4$.

The ester in turn can be converted to a tetrasalt by conventional saponification procedures. Preparation of the salts in this manner is especially useful when salts of particularly high purity are desired.

Alternatively, the tetra salts can be prepared directly from the diacid diester by reacting an alkali metal or ammonium base (i.e., hydroxide, carbonate, or bicarbonate such as NaOH, NH$_4$OH, KOH, Na$_2$CO$_3$, NaHCO$_3$, K2CO$_3$ KHCO$_3$, (NH$_4$)$_2$CO$_3$, (NH$_4$)HCO$_3$ or mixtures thereof) with the diacid diester. Preparation of the salts in this manner often provides economic advantages.

The tetra alkali metal salt forms can be purified by any conventional purifying technique, such as crystallization and recrystallization in 50% to 70% EtOH/H$_2$O solutions.

A particularly preferred salt form of the invention is tetra sodium o-phenylenedioxydimalonate in view of the availability of raw materials for its manufacture and its excellent performance as a detergency builder.

The tetra acid forms of this invention are prepared by acidfying either the diacid diester or the tetra esters, with strong acids such as HCl, HBr, or H$_2$SO$_4$. The tetra acids in turn can be neutralized to the tetra salt form.

The diacid disalt, trisalt monoacid, trisalt monoester, triacid monosalt, triacid monoester, triester monosalt, triester monoacid, monosalt monoacid diester, monosalt diacid monoester, and disalt monoacid monoester forms of the compounds of this invention (which are also intermediates for the builder salts) can be derived from the tetra acid using conventional partial neutralization and/or partial esterification techniques.

The detergent formulations utilizing the compounds of this invention will contain from 1 to 75% by weight, preferably from 5 to 50% by weight of the salt, preferably sodium salt, forms of the compounds of this invention. Such compounds can be utilized as the sole detergency builders in the compositions or in combination with other known builders such as water soluble inorganic builder salts, for example, alkali metal carbonates, borates, phosphates, polyphosphates, bicarbonates and silicates or organic builders such as salts of phytic acid, sodium citrate, water soluble polymeric polycarboxylates such as described in U.S. Pat. 3,308,067, nitrilotriacetate and the like.

The detergent formulations additionally contain at least 8% by weight of a surfactant. Any of the numerous well-known anionic, nonionic, zwitterionic or ampholytic surfactants can be employed.

Examples of suitable anionic surfactants include alkyl ethyl sulfonates, alkyl sulfates, acyl sarcosinates; acyl esters of isocyanates, acyl N-methyl taurides, and alkyl aryl sulfonates. The foregoing materials are used in the form of their water-soluble sodium, potassium, ammonium and alkyl ammonium salts. Specific examples include sodium lauryl sulfate; sodium N-methyl aluryll tauride; sodium dodecyl benzene sulfonate; and triethanol amine undecanol benzene sulfonate.

Examples of suitable nonionic detergents include alkyl phenol and alcohol alkoxylates including condensates of 1-decanol or 1-undecanol with from 3 to 5 molecular proportions of ethylene oxide; condensates of monohydroxy or polyhydroxy alchols such as oleyl alcohol or 1-tridecanol with from 9 to 15 molecular proportions of ethylene oxides; alkyl internal vicinal dialkoxy or hydroxy alkoxy compounds; and condensates of alkylene oxides with organo amines, for example, ethylene diamine and amides such as N-octadecyl diethanol amide.

Suitable ampholytic surfactants include the amido alkene sulfonates such as sodium C-pentadecyl, N-methyl amido ethyl sulfonate potassium C-octyl N-naphthalene amido propyl sulfonate; ammonium C-decyl, N-cyclo propyl amido butyl sulfonate, and aliphatic amine derivatives in which the aliphatic substituent contains an anionic water-solubilizing substituent such as a carboxy, sulfo, phosphato, or phosphino group, for example, sodium-3-dodecyl amino propionate and sodium-3-dodecyl amino propane sulfonate.

Examples of zwitterionic surfactants include derivatives of quaternary ammonium phosphonium and sulfonium compounds such as 3-(N,N-dimethyl-N-hexadecyl ammonio) propane-1-sulfonate and 3-(N,N-dimethyl-N-hexadecyl ammonio-2-hydroxy propane-1-sulfonate).

It will be understood that the above examples of supplementary surfactants are by no means comprehensive. Numerous other surfactants are known to those skilled in the art and are set forth in such familiar references as Surface Active Agents by A. M. Schwartz and James W. Perry. It will be further understood that the use of such surfactants will be in accordance with conventional, well-understood practices of detergent formulation. For example, cationic and anionic detergents will not normally be employed in combination due to recognized problems of precipitation of insoluble products.

In accordance with general practice, the ratio of the detergency building components to the surfactant components will be in the range of from 1:2 to about 12:1 by weight.

In addition to surfactant and builder components, the detergent formulations may contain fillers such as sodium sulfate and minor amounts of bleaches, dyes, optical brighteners, soil anti-redeposition agents, perfumes and similar conventional detergent formulation additives.

The invention is further illustrated by the following examples wherein all parts and percentages are by weight unless otherwise indicated.

EXAMPLE I

A solution of 43 gm. (0.425 mole) of diisopropylamine in 300 ml. of tetrahydrofuran is charged into an N$_2$ purged 1000 ml. 4 necked flask, equipped with a mechanical stirrer. The solution is cooled to −70° C., and 185 ml. of a 2.4 molar solution of n-butyl lithium in hexane is added to form a strong base: diisopropylamide. A solution of 60 g. of diethyl-o-phenylenedioxydiacetate (the starting ester) in 100 ml. of tetrahydrofuran is added dropwise to the base, generating the diester dianion. While maintaining the −70° C. temperature, $CO_2$ gas is passed through the mixture in a 2:1 mole ratio of $CO_2$ to diester dianion for 1 hour, to form the dilithium diester. The solution is allowed to warm to 25° C. The tetrahydrofuran is removed on a rotary evaporator. The dilithium diethyl ester is converted to the diacid diester (dihydrogen diethyl o-phenylenedioxydimalonate) by contact with a sulfonated polystyrene resin (Rexyn® 101, Fisher Products Co.). The $H_2O$ is removed on a rotary evaporator. The reaction mixture is placed in a 1000 ml. flask and neutralized with 68 gm. of 50% NaOH and the tetra sodium o-phenylenedioxydimalonate is crystallized out of solution by addition of a 60% by volume aqueous solution of ethanol.

The salt is identified from the hydrogen nuclear magnetic resonance spectrum in water as having two singlets, one being aromatic protons at 7.3 p.p.m., and the other being malonate protons at 5.3 p.p.m., the relative areas of signals being 2:1.

The o-phenylenedioxydimalonic acid is prepared by acidifying the diacid diester with hydrochloric acid. The tetra ethyl or phenylenedioxydimalonate is prepared by reacting the diacid diester with ethanol in the presence of a catalytic amount of $H_2SO_4$.

EXAMPLE II

The procedure of Example I is followed, except that 6 gm. of diethyl o-phenylenedioxy-α,α'-dimethyldiacetate is utilized as the starting ester in place of the 60 gm. of diethyl-o-phenylenedioxydiacetate.

The salt obtained by reaction of the diacid diester with sodium hydroxide is identified as tetra sodium o-phenylenedioxy-α,α'-dimethyldimalonate by the hydrogen magnetic resonance spectrum:

| Chemical shift, p.p.m. (vs. external TMS) | Relative intensity |
|---|---|
| 7.3 | 4 |
| 1.5 | 6 |

EXAMPLE III

The procedure of Example I is followed, except that 72 gms. of diethyl-o-phenylenedioxy-α,α'-diethylacetate is utilized as the starting ester in place of the 60 gms. of diethyl-o-phenylenedioxydiacetate.

The salt obtained by reaction of the diacid diester with sodium hydroxide is identified as tetra sodium o-phenylenedioxy-α,α'-diethyldimalonate by the magnetic resonance spectrum:

| Chemical shift, p.p.m. (vs. external TMS) | Coupling constant, Hz. | Relative intensity |
|---|---|---|
| 7.6 | | 4 |
| 2.6 quartet | 7.0 | 4 |
| 1.5 triplet | 7.0 | 6 |

What is claimed is:

1. A compound represented by the formula

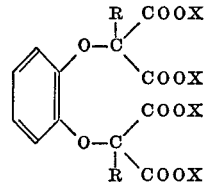

wherein R is selected from the group consisting of hydrogen, methyl, and ethyl, both R groups in said compound being identical and X is selected from the group consisting of hydrogen, alkali metal, ammonium, methyl, ethyl and propyl.

2. The compound of claim 1 wherein two of the X constituents are selected from the group consisting of methyl, ethyl, and propyl and two of the X constituents are selected from the group consisting of alkali metal and ammonium.

3. The compound of claim 1 wherein two of the X constituents are selected from the group consisting of methyl, ethyl and propyl, and two of the X constituents are hydrogen.

4. The compound of claim 1 wherein X is selected from the group consisting of methyl, ethyl and propyl, all X constituents being identical.

5. The compound of claim 1 wherein X is selected from the group consisting of alkali metal and ammonium.

6. The compound of claim 1 wherein R is hydrogen and X is sodium.

References Cited

UNITED STATES PATENTS 2,516,955   8/1950   Botler et al. _____ 260—473 G

LORRAINE A. WEINBERGER, Primary Examiner

J. F. TERAPANE, Assistant Examiner

U.S. Cl. X.R.

210—58; 252—89, 132, 180, 541, 539, Digest 11; 260—521 R

U-1050
(5/69)

UNITED STATES PATENT OFFICE
CERTIFICATE OF CORRECTION

Patent No. 3,799,970      Dated March 26, 1974

Inventor(s) Marvin M. Crutchfield
John N. Rapko

It is certified that error appears in the above-identified patent and that said Letters Patent are hereby corrected as shown below:

Column 5, line 32, "6 gm." should be --- 66 gm. ---.

Signed and sealed this 29th day of October 1974.

(SEAL)
Attest:

McCOY M. GIBSON JR.
Attesting Officer

C. MARSHALL DANN
Commissioner of Patents